MULTI-TRACK MAGNETIC RECORDER WITH ROTATABLE HEAD ASSEMBLY

Filed Aug. 1, 1963

2 Sheets-Sheet 1

INVENTOR
JAMES L. GRAY

BY David Teacline

ATTORNEY 3,332,085
MULTI-TRACK MAGNETIC RECORDER WITH ROTATABLE HEAD ASSEMBLY

James L. Gray, Maple Glen, Pa., assignor to Sperry Rand Corporation, New York, N.Y., a corporation of Delaware Filed Aug. 1, 1963, Ser. No. 299,302
7 Claims. (Cl. 346—74)

ABSTRACT OF THE DISCLOSURE

A magnetic read-write head assembly which includes a body member having a plurality of magnetic transducer elements disposed along the principal axis of the body member. The body member is adapted to be rotated through 180 degrees about an axis which is normal to the principal axis and the transducer elements are disposed asymmetrically relative to the axis of rotation so that in one position of the body member the transducer elements will engage odd-numbered tracks on a magnetic medium passing over the body member and even-numbered tracks in the other position of the body member.

Figure 1:
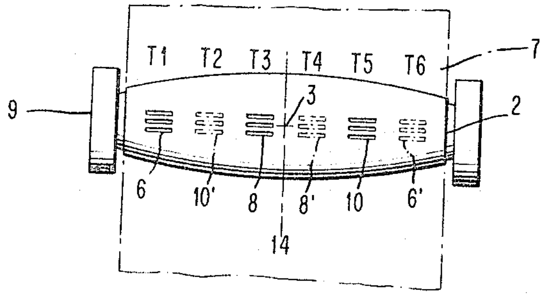

This invention relates to magnetic recording and reading systems and more particularly to an improved magnetic reading and recording system which provides increased density of recording.

Increases in the speed of operation and capability of modern computers and data processing equipment, puts greater demands upon the information storage equipment for increased storage capacity and rapid access. Increases in storage capacity can be achieved by increasing the physical size or the number of storage units. Such increases are costly and in many instances limited by the physical plant available or the maximum number of storage devices which a data processing system or computer can handle. The most obvious approach to increase the capacity of the existing storage equipment is to increase the density of recording which is permitted on the available storage media. This may be accomplished by decreasing the spacing between individual magnetic read-write transducers and thus allow for recording at closer track spacing. Reductions of this type, however, are limited by certain physical and electrical factors. Electrically, the current which is supplied to the write transducer is limited to a value which is sufficient to cause proper magnetization of the magnetizable medium, but not so high as to cause cross-talk between the desired magnetic track and its adjacent tracks. Such cross-talk could either cause the erasing or the undesired recording in these adjacent tracks. One of the major physical factors which limits the closeness of adjacent magnetic read-write transducers is the contact between the coils of the respective transducers. As is well known in the recording art, each of the transducing devices is required to have one or more coils upon a central core member. One or more of these coils are used to supply write current to record upon the magnetizable medium. A further coil or coils are employed to provide current to the read amplifiers to permit the reading of the magnetized sections of the record. Due to the physical size of the coils upon the cores to the transducer, there is a certain minimal spacing which is determined by the contact of the coils of two adjacent transducers. As a result of the contact of adjacent coils, a certain amount of space between the transducer cores cannot be used for recording. Thus the space is wasted. In an effort to increase the density of recording upon a magnetizable medium, a system known as U-turn recording has been evolved. In the U-turn recording system, information may be recorded upon one portion of the magnetizable media during movement of the media in a first direction. At this time, recording may take place on the tracks which are oddly numbered across the media width, that is, the information is recorded within the first, third, fifth, etc. tracks of the media. When the media has been completely run in this first direction, the media is reversed and the magnetic transducers are shifted or a further set of transducers are brought into contact with the media and the interspace tracks, that is, the second, fourth, etc. tracks are recorded during the time that the media is moving in the second direction.

In the prior art patent to P. R. Gilson, 2,916,728, for Magnetic Recording and Reading Systems, issued Dec. 8, 1959, a typical U-turn magnetic tape device is shown. In this device, two sets of transducers are used for recording and reading. The first of such transducer sets is arranged to record or read from odd numbered tracks. The second transducer set is provided to record or read from even numbered tracks. Two tape lifters are provided to bring the tape into intimate contact with one or the other of said transducer sets. During the motion of the tape in one direction, a first of the tape lifters is employed to cause the tape to contact the first magnetic transducer set and thus record, for example, the odd tracks. When the tape has been completely moved in one direction, the first tape lifter is disengaged and the second tape lifter is engaged to bring the tape into intimate contact with the second magnetic transducer set permitting the recording of the even numbered tracks as the tape runs in the opposite direction. Such a device requires the employment of two sets of magnetic transducers, only one of which is used at a time. This requires that the transducers be accurately placed so that overlapping of tracks will not occur. It further requires that the media be accurately guided to provide that the tape crosses both magnetic transducers in a constant relative position. The requirement for two sets of transducers as well as accurate positioning of the tape with respect to these transducing stations makes the device delicate and costly. Other systems employed in U-turn recording require mechanical devices to shift the heads from a position where they can record upon the odd tracks to a second position where they can record upon the even tracks. Such a manual device is clumsy in operation and requires constant attendance of an operator and further requires precision stops to insure that the shifted transducer will take its proper position with respect to the desired channels on the magnetic media.

The problems generally described above are intensified when a sophisticated type of recording system is employed; for example, in a system which employs a check reading device to determine the accuracy with which information was recorded. A typical transducer employed with such a system would contain a write gap, a check-read gap and an error-marking gap, respectively. All of these gaps are important. The write gap writes the information which it receives from the input device. The check-read gap then reads the information just recorded and compares it to the input information. In the event that an error has occurred, the error-marking gap serves to put a notation upon the magnetic media to indicate that this information is an error and should be disregarded in further readings. In order for this type of system to operate properly, it is necessary that the gaps appear in proper order with respect to the tape motion. Thus in the mechanical system briefly described above, it is necessary not only to shift the head from a position adjacent the odd numbered tracks to a position adjacent the even numbered tracks, but it is also necessary to rotate its 180° to insutre that the proper arrangement of gaps for the purposes specified above appears for each direction of media movement.

It is, therefore, an object of this invention to provide an improved form of magnetic reading and recording device.

It is another object of this invention to provide an improved form of magnetic read and recording device which operates with the U-turn recording technique.

It is yet another object of this invention to provide a magnetic reading and recording device which is capable of operating at increased recording density.

It is still another object of this invention to provide a magnetic reading and recording device by which a magnetic transducer is provided which is rotatably mounted and which can be used in one position to record in a first direction of magnetic media movement and in a second to record in a second direction of movement of a magnetic media.

Other objects and features of the invention will be pointed out in the following description and claims and illustrated in the accompanying drawings, which disclose by way of example, the principle of the invention and the best mode of operation which has been contemplated for carrying it out.

In the drawings:

FIGURE 1 illustrates a magnetic transducing assembly constructed in accordance with the principles of the invention and which illustrates the positions which the transducers occupy for each of the respective directions of motion of the magnetic media upon which information will be recorded.

Figure 2A:
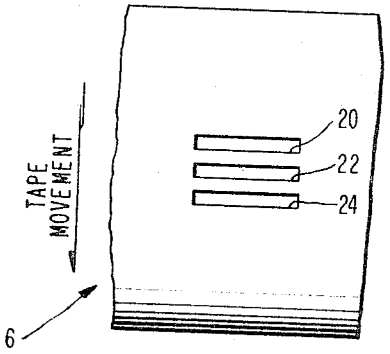
Figure 2B:
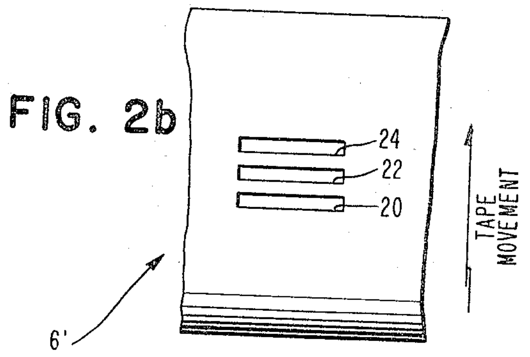

FIGURES 2*a* and 2*b* show an idealized form of magnetic read-write transducer for use with the device of FIGURE 1.

Figure 3:
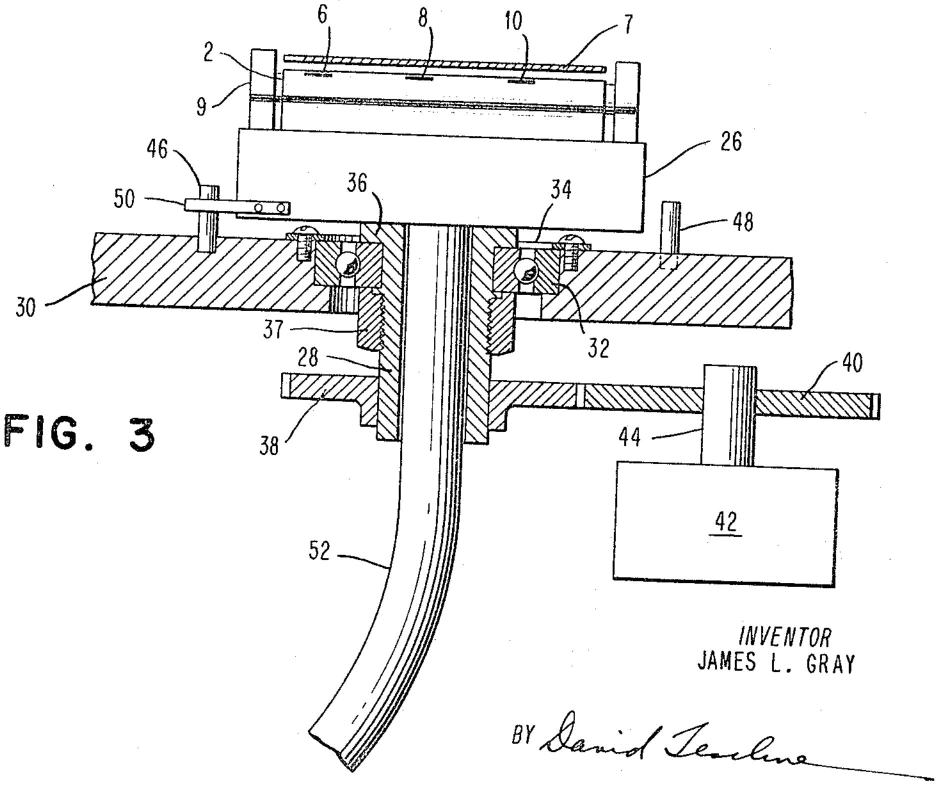

FIGURE 3 is a partial sectional view of the assembly used to support and rotate the magnetic transducer assembly of FIGURE 1.

Figure 4:
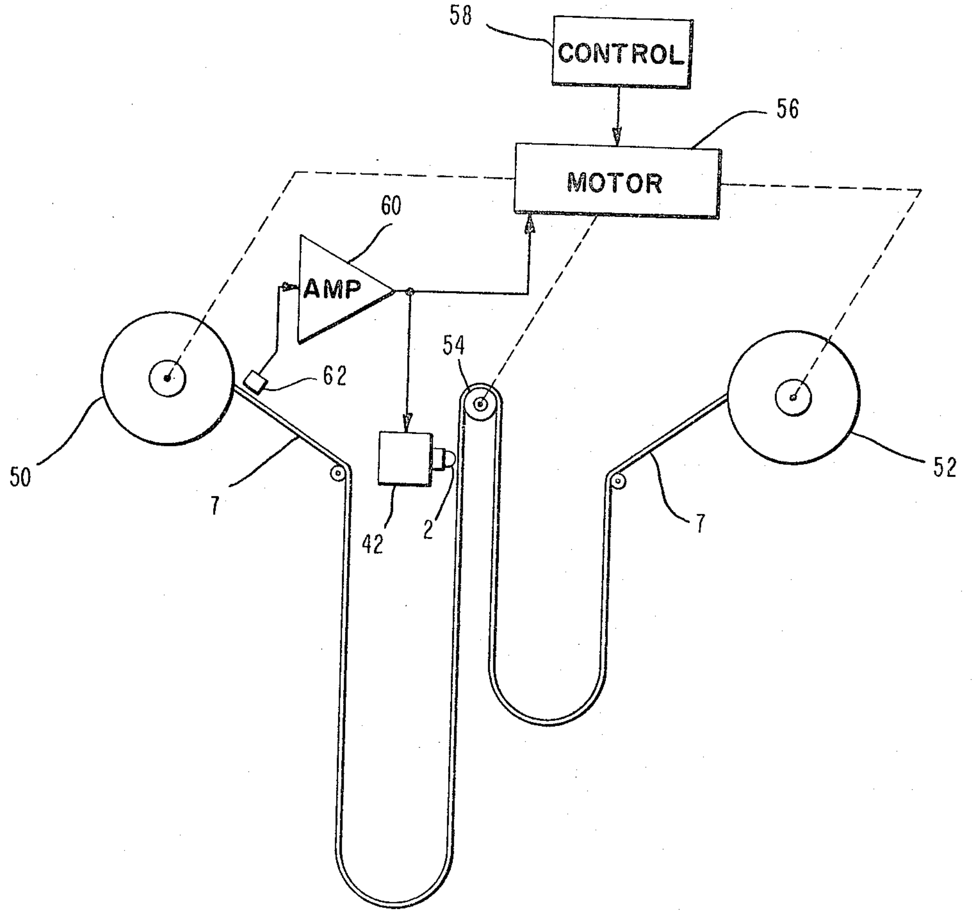

FIGURE 4 schematically illustrates a tape handling system employing a transducer assembly constructed in accordance with the concepts of the invention.

In order to overcome the above-described difficulties encountered in the use of present day U-turn type recording and reading equipment, a rotatable magnetic head assembly is provided which is free to rotate 180° in a plane above the magnetizable media. In a first position the transducers are mounted upon the magnetic head transducer assembly to record in either the even or odd numbered tracks while the magnetizable media is caused to move in a first direction. Upon the changing of the direction of the magnetizable media, the magnetic transducer assembly is rotated 180° to place the transducers employed for recording in the first direction in odd tracks now over even numbered tracks to permit recording therein. Due to the rotation of the head assembly about its pivotal point, the integrity of the head gaps is maintained for both directions of operation of the magnetizable media. A single magnetic transducer may be employed in this manner to record in two individual tracks. Such scheme permits the reduction of the total number of transducers which are required to record in all possible tracks of the magnetizable media and further insures that the proper positioning of the gaps of the individual heads is maintained regardless of the direction of travel of the magnetizable media. Further, although the head assembly is rotated, it is not shifted in any direction and it permits accurate placing of the head assembly with respect to the width of the tape.

Turning now to FIGURE 4, a tape handling system employing the concepts of the invention is shown in schematic form. A tape 7 is advanced from a supply spool 50 to a take-up spool 52 by means of a capstan 54. The spools 50 and 52 and the capstan 54 are driven by means of a reversible motor 56 which can cause the tape 7 to be advanced in either direction. That is from spool 50 to spool 52 or from spool 52 to spool 50. The direction of the tape travel can be controlled either manually from a control box 58 or electrically from an amplifier 60 operating in response to the direction of special data on the tape. The control box 58 can have forward and reverse switches to control the current direction to the field of the motor 56. The amplifier 60 serves to direct signals to the motor 56 to change the direction of current flow in the motor 56 field, when the detector 62, to which it is connected at its input, provides signals indicative of starting or stopping patterns upon the tape. Thus if the tape 7 is run in a first direction, upon the detection of a stop pattern by the detector 62 which may be of the photoelectric type, a signal will be applied to the amplifier 60 which in turn produces a change in the field current direction of the motor 56 causing it to reverse its direction and that of the tape. The output of the amplifier 60 is also fed to a torque motor 42 to cause this motor to operate and rotate the transducer assembly 2 in a manner to be described.

Referring now to FIGURE 1 there is shown a magnetic transducer assembly 2 constructed in accordance with the concepts of this invention. The magnetic transducer assembly 2 is arranged to be pivotally rotated about a central point 3. A magnetizable tape 7 is arranged to be moved below the magnetic transducer assembly 2 (by means not shown), guided by a series of gutters 9 slightly in excess of the width of the tape itself. The arrangement of the gutters and the magnetic transducer assembly permits operable alignment of the magnetizable surface with the magnetic transducer assembly. The means for moving the tape is arranged to permit motion of the tape in either of two directions, that is, one towards the top of the figure and a second towards the bottom of the figure.

The individual transducers 6, 8 and 10 are set upon the transducer assembly 2 in such a manner that the transducers describe three distinct spaced tracks along the width of the tape 7. When the assembly 2 is rotated about its central point 3, the transducers 6, 8 and 10 now take up positions interspersed with the first three tracks established. To achieve this result, the head 8 is displaced to the left from the center line 14, a distance equal to one-quarter the distance between adjacent transducers. The transducers 6 and 10 are placed at equal distances from transducer 8 to the left and right respectively. Thus when the tape is caused to move in a direction towards the bottom of the figure, the heads 6, 8 and 10 will cause the information to be recorded or read from the tracks numbered T1, T3 and T5. When the direction of motion of the media is changed, that is, now moving towards the direction of the top of the figure, the magnetic transducer assembly, as will be described below, is caused to be rotated 180° to place the heads 6, 8 and 10 in positions shown as 6', 8' and 10'. Due to this rotation of the head assembly, the transducer 6' will now record in a track designated T6. Transducer 8' will now record in a track designated T4 while the transducer 10' will record in the track T2. It is thus obvious that after a double run of the media, that is, in the first and second directions, all six of the channels across the width of the tape 7 will be recorded.

Referring now to FIGURE 2*a* there is shown a typical magnetic transducer of the type shown in FIGURE 1 at 6. The figure is highly simplified and illustrates the arrangement of the respective gaps for the required functions. The transducer 6 consists of a write gap 20, a check-read gap 22 and an error-marking gap 24. Movement of the tape with respect to the transducer is in the direction of the arrow, that is, downward. As briefly explained above, the gaps function respectively to write information provided from an input source by means of the write gap 20, to read the information which has just been recorded upon the media by a check-read gap 22. This information may be compared against the input information in a comparator (not shown) to determine whether or not the recording was correct. Finally an error-marking gap 24 which in the presence of an error indicated by the comparator puts a distinctive pattern upon the tape so that in further readings of the tape this information will be disregarded. FIGURE 2*b* shows the head 6 rotated 180° to a position designated 6'. The tape motion is now in the direction of the arrow, that is, towards the top of the figure. It can be seen that despite the rotation of the transducer from position 6 to position 6' the gaps are maintained in the same relative order, that is the gaps 20, 22 and 24 are all in the direction of travel of the magnetic media.

FIGURE 3 illustrates in partial sectional form the magnetic transducer assembly and the mechanism employed to rotate the position of the transducer assembly 180°. The tape 7 is caused to be moved across the multi-channel magnetic transducer assembly 2 by means not shown. This means is arranged to permit the movement of the tape in two directions, one coming out of the plane of the drawing and a second going into the plane of the drawing. Individual transducers 6, 8 and 10 are illustrated in the first position. The heads 6, 8 and 10 are located in a head holder 26 arranged to rotate about its axis. The head holder 26 is attached to a shaft 28 placed into a hole drilled in a base plate 30 which also contains ball bearing assembly 32. The ball bearings are held in place by means of a series of nuts 34 anchored to the base plate 30. The shaft is prevented from lateral motion by means of the collars 36 upon the shaft and a retaining lock nut 37 placed below the base plate and anchored in such a manner as to permit the shaft to rotate within it but not to vertically move. Attached to the lower end of the shaft 28 is a gear 38 which is made to mate with a second gear 40 to provide for rotation of the head assembly. The gear 40 is driven by means of a torque motor 42 via a shaft 44. The motor is a reversible type motor well known in the art and is driven from the tape reversing mechanism not shown. Thus when the tape is moving in a first direction the torque motor 42 will be caused to rotate in a first direction causing the gear 40 to be driven in such a direction. On reversing of the tape, a signal will be sent to the torque motor to cause it to reverse its direction. The relative position of the magnetic transducer assembly for its two positions is fixed by means of a set of stop pins 46 and 48 which contact stop member 50 mounted upon the head holder 26. Thus for the first position of the head assembly, the stop member 50 will contact the stop pin 46 fixing the relative position of the assembly in the plane of the tape. When the tape is reversed in direction, the head assembly will be permitted to rotate and stop member 50 will come in contact with the second stop pin 48 to again define its relative rotational position with respect to the tape plane. Leads to the individual coils of the heads 6, 8 and 10 are made by means of the cable 52 which is shown connected to the respective heads through the hollow shaft 28.

It should be understood that while a three-head magnetic transducer assembly has been shown, the number of heads may be increased or decreased as is required to meet the specific size of the magnetizable media. It should be understood, also, that although a tape has been shown for illustrative purposes, the device is capable of operation with any type of magnetizable media such as a magnetic drum or magnetic cards. It should be further understood that although a particular form of the rotating mechanism has been shown this is for illustrative purposes only and any other suitable means may be employed.

While there have been shown and described and pointed out fundamental novel features of the invention as applied to the preferred embodiments, it will be understood that various omissions and substitutions and changes of the form and details of the device as illustrated and its manner of operation may be made by those skilled in the art, without departing from the spirit of the invention.

The embodiments of the invention in which an exclusive property or privilege is claimed are defined as follows:

1. In a magnetic recording system adapted to selectively record in selected ones of a plurality of tracks on a magnetizable media, the combination comprising: a rotatable magnetic transducer assembly comprising *n* number, where *n* is greater than 1, of magnetic transducers arranged in said assembly to record upon *n* odd numbered tracks or *n* even numbered tracks of said magnetizable media, said magnetic transducers each being capable of recording selected discrete areas in the tracks on said magnetizable media; means adapted to transport said magnetizable media past said transducer assembly, said transport means being capable of transporting said magnetizable media in either of two opposite directions; means for positioning said transducer assembly to place said transducers adjacent either said *n* odd numbered tracks or said *n* even numbered tracks to selectively record thereon when said magnetizable media is being moved in one of its two directions; means coupled to said positioning means adapted to receive control signals and to cause said rotatable magnetic transducer assembly to be rotated in position to place said transducers adjacent the other of said *n* odd numbered tracks or *n* even numbered tracks to selectively record thereon when said magnetizable media is being moved in the other of its two directions; and means to generate said control signals when the direction of movement of said magnetizable media is to be changed by said transport means.

2. A device claimed in claim 1, wherein a first of said magnetic transducers is located displaced from the center of said magnetic transducer assembly by a distance equal to one fourth the distance between adjacent transducers, and where all remaining magnetic transducers are placed equal distances from said first magnetic transducer to either side and distributed along said assembly such that said transducers will record in first tracks upon said magnetizable media when said assembly is in a first position and in intermediate tracks when said assembly has been rotated.

3. In a magnetic recording system adapted to selectively record in selected ones of a plurality of tracks on a magnetizable media, the combination comprising: a rotatable magnetic transducer assembly, comprising three magnetic transducers arranged in said assembly to record upon alternate tracks of said mangetizable media, said magnetic transducers each being capable of recording selected discrete areas in the tracks on said mangetizable media; means adapted to transport said magnetizable media past said transducer assembly, said transport means being capable of transporting said magnetizable media in either of two directions; means for positioning said transducer assembly to place said transducers adjacent first, third and fifth tracks upon said magnetizable media to selectively record thereon when said magnetizable media is being moved in a first of its two directions; means coupled to said positioning means adapted to receive control signals and to cause said rotatable magnetic transducer assembly to be rotated in position to place said transducers adjacent sixth, fourth and second tracks upon said magnetizable media to seelctively record thereon when said magnetizable media is being moved in a second of its two directions; and means to generate said control signals when the direction of movement of said magnetizable media is to be changed by said transport means.

4. A device claimed in claim 3, wherein a first of said magnetic transducers is located displaced from the center of said magnetic transducer assembly by a distance equal to one fourth the distance between adjacent transducers, and where all remaining magnetic transducers are placed equal distances from said first magnetic transducer to either side and distributed along said assembly, such that said transducers will record in first tracks upon said magnetizable media when said assembly is in a first position and in intermediate tracks when said assembly has been rotated.

5. In a magnetic recording or recovering system, the combination comprising, a magnetic media, a magnetic transducer assembly having a surface, and a plurality of magnetic transducers spaced along one dimension of said assembly with the gaps of said transducer elements terminating in said surface along one dimension thereof, means for rotating said assembly about an axis normal to said surface, each of said transducers being capable of recording or recovering information along discrete tracks of said media when said media is passed adjacent said surface in either of two opposite directions transverse to the spacing of said transducers, means for transporting said media in either of said two directions, means coupled to said means for rotating said transducer assembly and responsive to control signals applied thereto to rotate said assembly through 180 degrees, and means for generating said control signals when the direction of movement of said media is to be reversed.

6. A device claimed in claim 5, wherein a first of said plurality of magnetic transducers is located displaced from the transverse center line of said one dimension of said surface by a distance equal to one fourth the distance between adjacent transducers, and where all remaining magnetic transducers are placed equal distances from said first magnetic transducer to either side and distributed along said assembly such that said transducers will record in first tracks upon said magnetizable media when said assembly is in a first position and in intermediate tracks when said assembly has been rotated.

7. The combination comprising, a magnetic transducer assembly having a surface, said surface having a center line, a plurality of magnetic transducers spaced transversely to said center line, said plurality of transducers having their gaps terminating in said surface and being distributed so as to have at least one transducer on each side of said center line with the position of the transducers on one side of the center line being different from the position of the transducers on the other side of the center line, and means for rotating said assembly through 180 degrees about an axis which is normal to said surface and which passes through said center line.

References Cited

UNITED STATES PATENTS

| | | | |
|---|---|---|---|
| 2,793,253 | 5/1957 | Howey | 179—100.2 |
| 3,169,720 | 2/1965 | Proctor | 179—100.2 X |
| 3,197,575 | 7/1965 | Eckstein | 179—100.2 |

FOREIGN PATENTS

| | | |
|---|---|---|
| 174,220 | 3/1953 | Austria. |
| 1,152,405 | 6/1956 | France. |

BERNARD KONICK, *Primary Examiner.*

TERRELL W. FEARS, *Examiner.*

L. J. SCHRODER, *Assistant Examiner.*